United States Patent [19]
Kamiguchi et al.

[11] Patent Number: 5,756,954
[45] Date of Patent: May 26, 1998

[54] WIRE ELECTRIC DISCHARGE MACHINING METHOD AT A CORNER

[75] Inventors: Masao Kamiguchi, Minamitsuru-gun; Masaya Ito, Fussa; Toshiyuki Ogata, Oshino-mura, all of Japan

[73] Assignee: Fanuc Ltd., Yamanashi, Japan

[21] Appl. No.: 619,593

[22] PCT Filed: Jul. 25, 1995

[86] PCT No.: PCT/JP95/01477

§ 371 Date: Mar. 26, 1996

§ 102(e) Date: Mar. 26, 1996

[87] PCT Pub. No.: WO96/03247

PCT Pub. Date: Feb. 8, 1996

[30] Foreign Application Priority Data

Jul. 27, 1994 [JP] Japan ................. 6-193825

[51] Int. Cl.⁶ .................. B23H 1/00; B23H 7/06
[52] U.S. Cl. .................................... 219/69.12
[58] Field of Search ................. 219/69.12, 69.17

[56] References Cited

U.S. PATENT DOCUMENTS

| | | | |
|---|---|---|---|
| 4,081,652 | 3/1978 | Janicke et al. | 219/69.12 |
| 4,292,491 | 9/1981 | Tanaka et al. | 219/69.12 |
| 4,581,513 | 4/1986 | Obara et al. | 219/69.12 |
| 5,410,117 | 4/1995 | Reynier et al. | 219/69.12 |
| 5,504,294 | 4/1996 | Izumiya et al. | 219/69.12 |

FOREIGN PATENT DOCUMENTS

| | | | |
|---|---|---|---|
| 55-112727 | 8/1980 | Japan. | |
| 58-40229 | 3/1983 | Japan | 219/69.12 |
| 1-27226 | 5/1989 | Japan. | |
| 5-228736 | 9/1993 | Japan. | |
| 654233 A | 2/1986 | Switzerland. | |

Primary Examiner—Geoffrey S. Evans
Attorney, Agent, or Firm—Staas & Halsey

[57] ABSTRACT

A wire electric discharge machining method capable of improving a machining accuracy of a corner portion. A machining feed speed is gradually reduced from a point A before entering a corner portion machining between points C and D, and in the corner portion between points C and D the machining is performed at a fixed feed speed. The feed speed is gradually increased from the point D, where the machining of the corner portion is completed, and is restored to the original speed. In accordance with the change of the feed speed, an off-state time of the voltage applied between a wire and a workpiece is increased from a point B and is reduced from a point E after completing the corner portion machining, to restore the original off-state time at a point F. Further, a flow rate of machining fluid is reduced depending on the corner portion. The feed speed, the off-state time and the flow rate of the machining fluid are controlled by automatically changing them in dependence on a curvature of the corner portion. A warp of the wire electrode is substantially prevented at the beginning of and during the corner portion machining, to thereby improve the machining accuracy of the corner portion.

4 Claims, 9 Drawing Sheets

WIRE ELECTRIC DISCHARGE MACHINING METHOD AT A CORNER

TECHNICAL FIELD

The present invention relates to a method of machining a corner portion of a workpiece by a wire electric discharge machine.

BACKGROUND ART

A wire electric discharge machining is performed by applying a pulse voltage between a wire electrode with a predetermined tension and a workpiece so that a discharge is generated in a gap between the wire electrode and the workpiece, and in the machining a pressure such as discharge pressure is produced between the wire electrode and the workpiece to cause a warp of the wire electrode. The warp of the wire is not so serious a problem in machining a straight portion. However, in machining a corner portion the warp of the wire electrode lowers a machining accuracy.

There are known methods for preventing the machining accuracy of the corner portion from lowering, which are exemplified by the disclosure in Japanese Patent Publications (Kokoku) Nos. 56-20133 and 56-16007. According to the methods, the machining feed is interrupted or a machining condition such as the feed speed is changed at a position of changing the feed direction to reduce the warp of the wire electrode and thereby improve the machining accuracy of the corner portion. In the above methods, however, as control such as interrupting the machining feed is executed at the time when a machining point reaches the feed direction changing position. This means that the machining is performed without correcting the warp of the wire electrode until the machining point reaches the feed direction changing position, thereby causing a problem of lowering the machining accuracy in a section until the machining point arrives at the feed direction changing position.

Japanese Patent Publication (Kokoku) No. 63-25891 discloses a method of actually measuring a warp of the wire electrode by means of a sensor to correct a machining path. According to this method, the warp of wire electrode is corrected to some degree; however, perfect correction is not possible because the wire warp rates in the vicinities of upper and lower wire guides differ from that in the intermediate position between the upper and lower wire guides. Moreover, there arises a problem such that a sensor for measuring the warp of wire electrode must be arranged in a discharge machining section.

DISCLOSURE OF THE INVENTION

An object of the present invention is to provide a wire electric discharge machining method which is capable of improving a machining accuracy in a corner portion.

The wire electric discharge machining method of the present invention comprises the steps of: reducing a machining feed speed from a first machining feed speed to a second machining speed in a section from a point preceding a machining starting point of the corner portion by a first predetermined distance to the machining starting point of the corner portion; increasing an off-state time of the pulse voltage from a first off-state time to a second off-state time in a section from a point preceding the machining starting point of said corner portion by a second predetermined distance to the machining starting point of the corner portion; maintaining the machining feed speed at the second machining feed speed and the off-state time of the pulse voltage at the second off-state time during the corner portion machining; and restoring the machining feed speed to the first machining feed speed and the off-state time of the pulse voltage to the first off-state time after completing the corner portion machining.

Moreover, the flow rate of the machining fluid is reduced by a predetermined rate during the corner portion machining so as to prevent the warp of the wire electrode. In addition, the off-state time of pulse voltage during the corner portion machining is determined in dependence upon a thickness of the workpiece, and the machining feed speed in the corner portion is automatically determined in accordance with a curvature of the corner portion and the off-state time in the corner portion.

The reduction of machining feed speed is started from a point preceding the machining start point of the corner portion for a predetermined distance and the off-state time of the pulse voltage applied between the wire electrode and the workpiece is increased in accordance with the reduced feed speed. Thus, the warp of the wire electrode is eliminated or made extremely small in the machining of the corner portion to thereby improve the machining accuracy of the corner portion. Further, as the corner portion machining is performed at a fixed feed speed and with a fixed off-state time, the corner portion is machined uniformly. Furthermore, the flow rate of machining fluid is controlled in accordance with an angle of the corner portion to prevent the warp of the wire electrode caused by a hydraulic pressure of the machining fluid. The warp of the wire electrode is eliminated and the machining accuracy of the corner portion is improved by combined effects of the reduction of the feed speed, the increase of the off-state time and the control of the flow rate of the machining fluid.

BEST MODE OF CARRYING OUT THE INVENTION

Figure 1A:
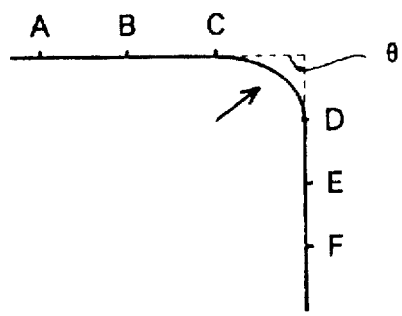
FIGS. 1a and 1b are explanatory views of a corner machining for a small circular arc according to the method of the present invention.
Figure 2A:
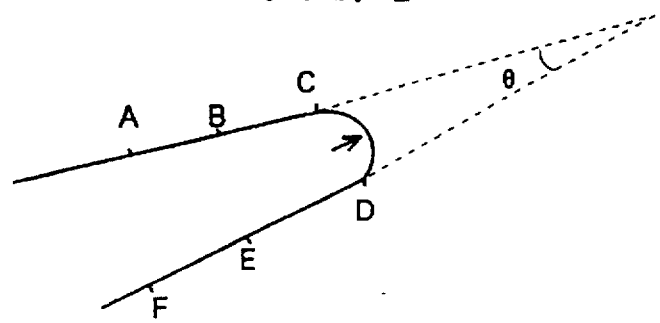
FIGS. 2a and 2b are explanatory views of a corner machining for a minute circular arc according to the method of the present invention.
Figure 2B:
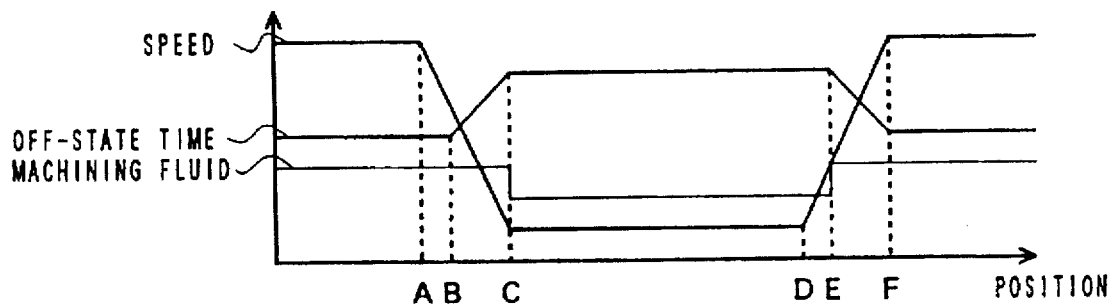
Figure 3A:
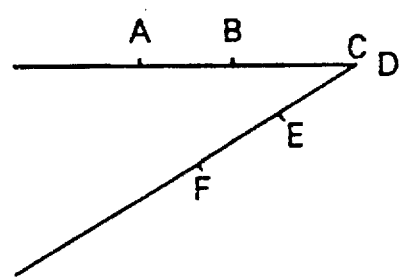
FIGS. 3a and 3b are explanatory views of an angular corner machining according to the method of the present invention.
Figure 3B:
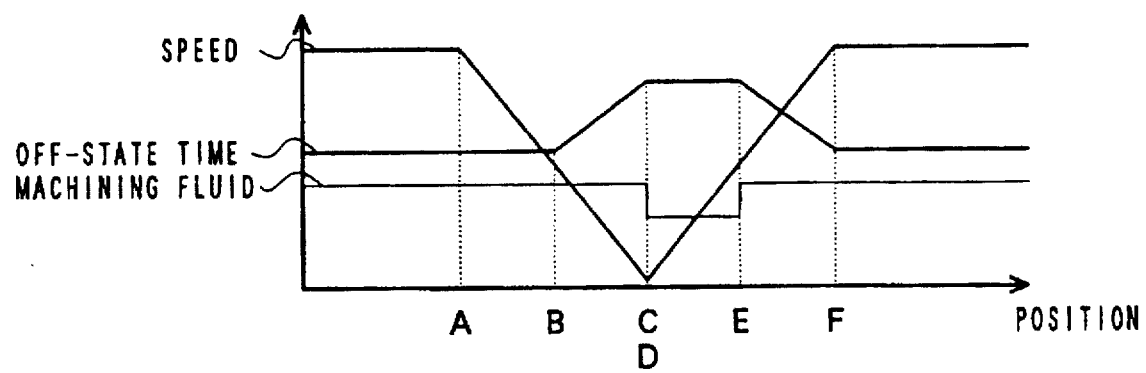

FIGS. 1a to 3b are explanatory views of machining for corner portions according to the method of the present invention. In the present invention, the corner portions to be machined are classified into four types, and the different corner machining control is performed in the four types of the corner portions; a corner portion which has a large-radius circular arc and does not require any special corner machining control, a corner potion which has a small-radius circular arc to be subjected to a small circular arc corner machining as shown in FIG. 1, a corner potion which has a smaller-radius circular arc and an angle smaller than a set value to be subjected to and a minute circular arc corner machining as shown in FIG. 2, and a corner portion having a summit which is not formed by a circular arc but by an intersection point of two straight lines as shown in FIG. 3.

Given that r is a circular-arc radius of the corner portion, R2 (preset value) is a maximum circular arc effective radius for executing the corner machining control, R1 (set value) is a minimum circular arc effective radius (to be set to a diameter of the wire electrode used) for executing the machining control for a minute circular arc corner, θ is an angle (hereinafter referred to as "corner angle") formed by intersecting tangential lines from a connecting point of front and rear blocks containing a circular arc of a corner portion, which is subjected to the corner machining control for the minute circular arc, and α (set value) is a corner angle for determining whether or not a corner portion is of a small circular arc or minute circular arc, the corner machining control is executed depending on the following relations.

(I) If r≧R2, any special corner machining control is not executed.

(II) If R2>r≧R1, or r<R1 and θ≧α, corner machining control for a small circular arc as shown in FIG. 1a is executed.

(III) If r>R1 and θ<α, the corner machining control for a minute radius circular arc as shown in FIG. 2a is executed.

(IV) If an apex of corner portion is not formed by a circular arc but by intersecting straight lines, the corner machining control for an angular corner machining control as shown in FIG. 3a is executed.

Figure 1B:
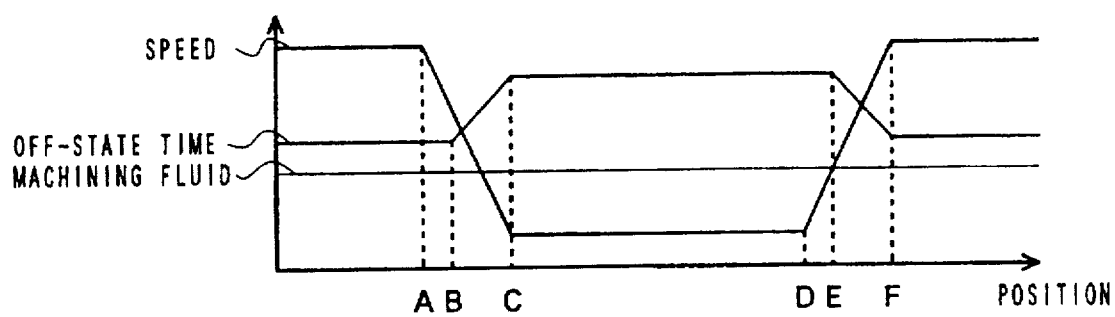

FIG. 1a shows a machining path of the corner machining for a small circular arc and FIG. 1b is an explanatory view of the corner machining control for the small circular arc.

A path between points C and D is a block of a circular arc which has a radius r and starts at point C and ends at point D. A reduction of machining feed speed is started at point A preceding the circular arc starting point C by a predetermined distance, as shown in FIG. 1b. Machining is effected with respect to a circular arc portion from the point C to the point D at a fixed machining feed speed. Then, the machining feed speed is increased at the end point D of the circular arc, and recovers its original speed at point F after a predetermined time elapses.

Moreover, in order to make a discharge per unit time on a machining surface substantially constant, taking account of a change in the machining feed speed, an off-state time of pulse voltage applied between the workpiece and the wire electrode from a discharge machining source is varied. The off-state time may be increased from the point A where a reduction of machining feed speed is started. However, if an increase of the off-state time is started earlier, a warp of the wire electrode is corrected to possibly cause a contact between the wire electrode and the workpiece to make a short circuit. Thus, in the present embodiment, the increase of off-state time is started from a point B which is preceding the starting point C of circular arc by a predetermined distance. The off-state time is kept to a fixed value from the starting point C to the end point D of the circular arc.

Subsequently, the off-state time is reduced at a point E after the lapse of a predetermined time from passing the end point D of the circular arc, and the original off-state time is recovered at a point F where the original machining feed speed is recovered. In the corner machining for a small circular arc, a flow rate of machining fluid is not varied.

FIG. 2a shows a machining path of the corner machining for the minute circular arc and FIG. 2b is an explanatory view of the corner machining for the minute circular arc. The corner machining control for the minute circular arc is executed in the case where a radius r of the circular arc block defined between points C and D is smaller than the above-mentioned set value, i.e., the minimum circular arc effective radius R1 (which is set to a diameter of the wire electrode), and an angle θ, which is formed between intersecting tangential lines at the starting point and the end point of the machining loci of the machining blocks connecting the circular arc block between the starting point C and the end point D, is smaller than a set corner angle α. This control substantially the same as the corner machining control for a small circular arc but differs in that the flow rate of machining fluid is reduced to a set value during machining of the corner portion. More specifically, the smaller the corner angle, the more the wire electrode is pushed by pressure of machining fluid to warp toward a groove formed by the electric discharge machining. Thus, in order to reduce the warp of the wire electrode, the reduction of the flow rate of machining fluid by a predetermined rate is started at the starting point C of the circular arc of the corner portion (after a slight time elapsed from the arrival at the point C), and the circular-arc corner portion is machined. Subsequently, the flow rate of machining fluid is restored to its original level at the point E where the off-state time is restored to its original level.

FIG. 3a shows a machining path of the corner machining for the angular corner and FIG. 3b is an explanatory view of the corner machining control for the angular corner. In the corner machining for the angular corner which is defined by two straight lines, the machining feed speed begins to decrease at point A preceding the end point C of the machining block, which is an apex of the angular corner, by a predetermined distance, then decreases to an extremely low speed in the vicinity of the end point C, and then begins to be increase on arrival at point C (=D), and is restored to its original level at point F after the lapse of a predetermined time from the arrival of point D (=C). The off-state time of pulse voltage begins to increase at point B preceding the point C by a predetermined distance, and kept constant from the point C to a point E after the lapse of a predetermined time from the arrival at the point C. Then, the off-state time begins to be reduce at the point E and is restored to the original level at the point F. Moreover, the flow rate of machining fluid is reduced by a predetermined rate between the point C (after the lapse of a slight time from the arrival at the point C) and the point E.

Figure 4:
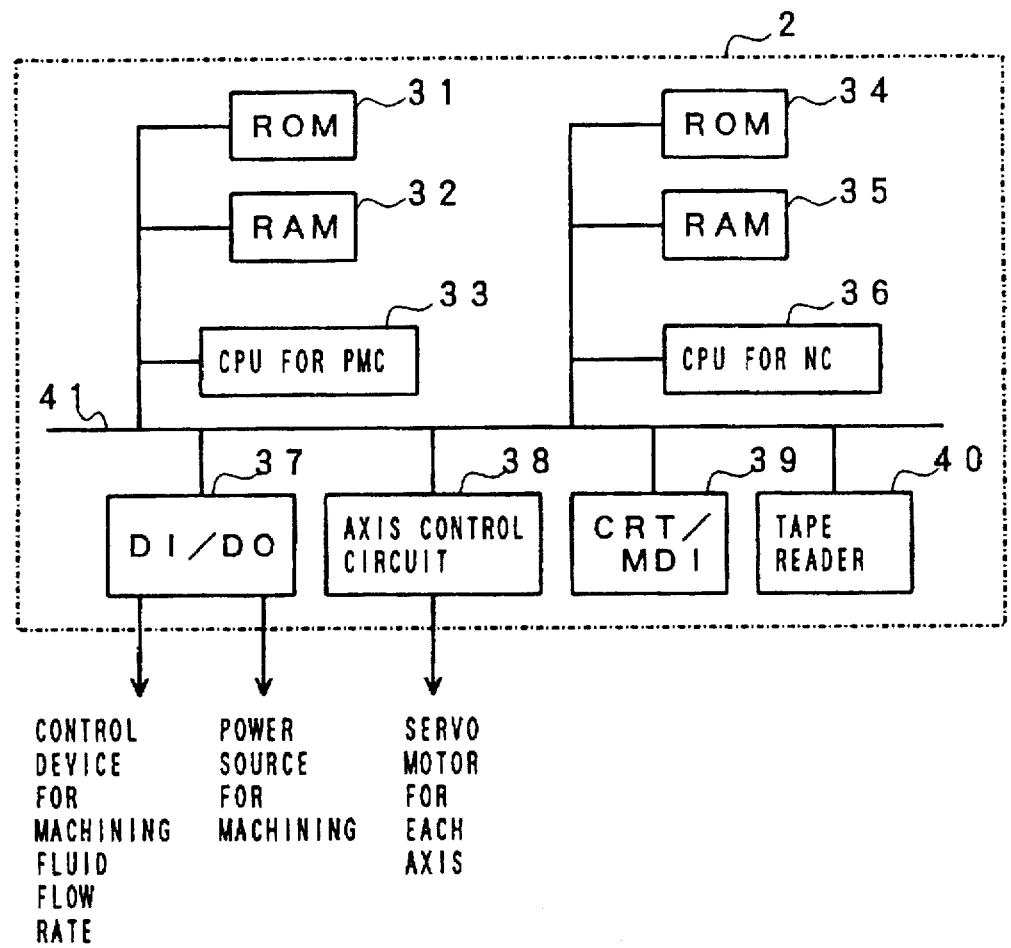
FIG. 4 is a block diagram showing principle parts of a control device of a wire-cut electric discharge machine for carrying out the corner machining method according to the present invention.

FIG. 4 is a block diagram showing only the principal parts of a control device 2 of a wire electric discharge machine for carrying out a wire electric discharge machining method of the present invention. The control device 2 includes a processor 33 for programmable machine control (hereinafter referred to as "PMC") and a processor 36 for numerical control, which are connected to a bus 41. The bus 41 is connected with a ROM 31 for storing sequence programs and corner control programs to be executed by the PMC processor 33, a RAM 32 as a data memory for temporarily storing data for the PMC processor 33 to make an operation, a ROM 34 for storing system programs of a numerical control unit, and a RAM 35 for temporary storage of data and a machining program read from a tape reader 40 for a workpiece. Further, the bus 41 is connected with various actuators and sensors of a flow rate control device for machining fluid and discharge machining source, an axis control circuit 38 connected to each of the servomotors of X-, Y-, Z-, U- and V-axes for moving the wire electrode relative to the workpiece for the electric discharge machining, and a CRT/MDI 39 as a display/input device.

When machining is started, the PMC processor 33 turns on the discharge machining source under the set discharge machining conditions, while the NC processor 36 make the axis control circuit 38 drive the servo motors for X-, Y-, Z-, U-, and V-axes according to machining programs stored in the RAM 35. Thus, the electric discharge machining is performed while the wire electrode is moved relative to the workpiece.

The foregoing arrangement of the wire-cut electric discharge machine and its control device is the same as conventional ones, and therefore the detailed explanations are omitted here.

Next, the electric discharge machining method for the corner portion according to the present invention will be further described. First, machining conditions such as a diameter of the wire electrode to be used, a material and a thickness of a workpiece, an on-state time of pulse voltage to be applied between the wire electrode and the workpiece, and an off-state time τ0 for a normal machining portion (straight machining portion), and PMC parameters necessary for the corner machining of the present invention are previously set and stored in the RAM 32. The PMC parameters are as follows:

d1: distance for starting the feed speed reduction (distance between A and C in FIGS. 1a, 2a and 3a)

d2: distance for starting the off-state time increase (distance between B and C in FIGS. 1a, 2a and 3a)

r1: reduction ratio (%) of the feed speed for the small circular arc corner r2: reduction ratio (%) of the feed speed for the minute circular arc corner r3: reduction ratio (%) of the feed speed for entering an apex of the angular corner t1: feed speed restoration time for the small circular arc corner t2: feed speed restoration time for the minute circular arc corner t3: feed speed restoration time for the angular corner t4: time for starting restoration of the off-state time and also time for restoring the flow rate of the machining fluid t5: time for starting reduction of the flow rate of the machining fluid τ1: off-state time for the small circular arc corner τ2: off-state time for the minute circular arc corner τ3: off-state time for the angular corner Fr: flow rate of machining fluid in the corner control The off-state times τ1, τ2 and τ3 for the corner portions are determined in dependence on a thickness of a workpiece so that they are increased in proportion to the thickness of workpiece. Also, parameters r1, r2 and r3, which are ratios for limiting feed speed, have a relation of r1>r2>r3 and the value of the parameter r3 is set very small.

After the machining conditions and set values for various parameters are determined as described above, the machining program stored in the RAM 35 is read or the machining program on a tape is read through the tape reader 40 to start the machining. The NC processor 36 executes a preliminary procedure shown in FIG. 5 in every interruption period. The processor clears registers Ra, Rb, Rc, Rx and Ry, transfers the stored contents of the register Ra to the register Rb, reads one block from machining program, and stores it in the register Rc (steps S1 to S4). Then, NC processor calculated the machining path based on the data stored in the registers Rb and Rc, taking account of the wire electrode diameter, in order to determine the path of the wire electrode for the machining of the block stored in the register Rb and overall length of the block. Further, if a block stored in the register Rc is of a circular arc, a radius r of the circular arc is calculated, a corner angle θ is calculated based on the data stored in the registers Ra and Rc, and the results of calculation are stored in the register Ry (steps S5 and S6). Next, it is determined whether or not interpolation processing has been executed based on the data stored in the register Rx (step S7). If the execution is completed (it is completed in the first stage), the data stored in the register Ry is transferred and stored in the register Rx (step S8), and the storage content of the register Rb is transferred and stored in the register Ra. Then, the processing comes back to step S2 and the above processing is repeatedly executed.

As a result, during an execution of machining on the basis of data calculated in step S5 and stored in the register Rx in step S8, the register Ra stores data of a block for which the machining is currently executed by the interpolation processing, the register Rb stores data of the next block and the register Rc stores data of the block after the next. Thus, if the data of the block stored in the resister Rb to be executed next is of a circular arc, a corner angle θ is calculated based on the data of the block currently executed and stored in the register Ra, and data of the block to be executed after the next (data of two blocks after) and stored in the register Rc in step S5, to store the calculated corner angle θ in the register Ry.

Figure 6:
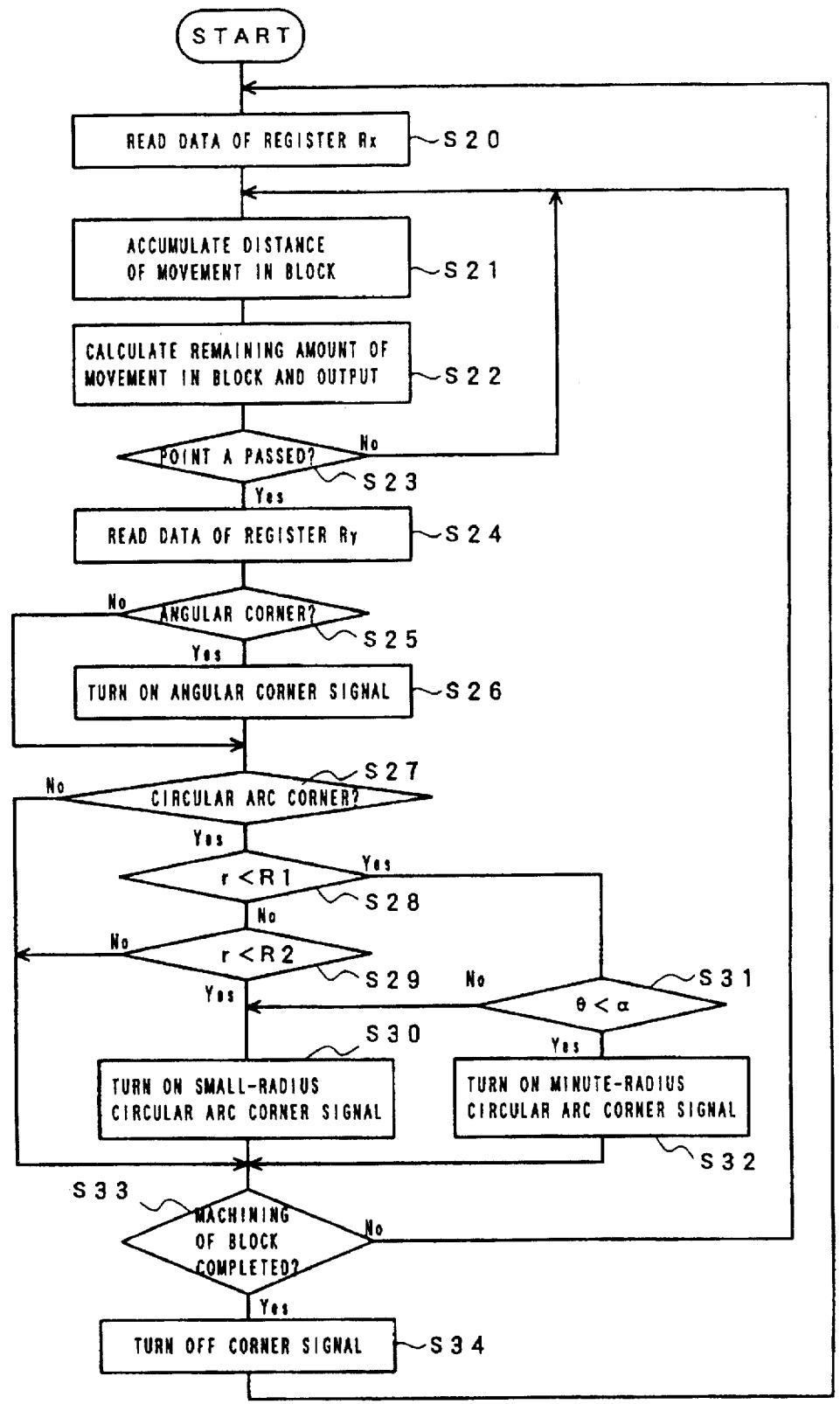
FIG. 6 is a flowchart of processing including interpolation processing.

On the other hand, the NC processor 36 executes a procedure shown in FIG. 6 in every interruption period. The NC processor reads data stored in the register Rx (step S20) to execute interpolation processing and drive each axis to carry out the machining. The interpolation processing is not directly related with the present invention, and therefore the explanation of interpolation processing is omitted in FIG. 6. According to the interpolation processing, the wire electrode is moved relative to the workpiece to perform the machining. The distance of movement in the block is accumulated to obtain the remaining distance in the block by subtracting the accumulated distance of movement from the total distance of the block, and the remaining distance is outputted to the PMC processor 33 (steps S21 and S22). Subsequently, it is determined whether or not the obtained remaining distance is equal to or smaller than the value of d1 (distance between points A and C) set as the PMC parameter. If it is larger than the parameter value d1, the sequence comes back to step S21, and the procedures of steps S21 to S23 are repeatedly executed. If the remaining distance becomes equal to or smaller than the value of d1 (on passing the point A), the processor reads the data of register Ry (step S24), and determines whether the corner portion is an angular corner or a circular arc corner (steps S25 and S27). If the corner portion is an angular corner, the NC processor turns on an angular corner signal to inform the PMC processor (step S26).

Also, if the corner portion is a circular one, it is determined whether or not a radius of the circular arc is smaller than the minimum circular arc effective radius (diameter of wire electrode) R1 (step S28). If it is not smaller, it is determined whether or not the radius is smaller than the maximum circular arc effective radius R2 (Step 26). In the case where the circular arc radius r has a relation of R1≦r<R2, a small circular arc corner signal is turned on (step S30). If the circular arc radius r is equal to or larger than the maximum circular arc effective radius R2, the processing advances to step S33. If the circular arc radius r is smaller than the minimum circular arc effective radius R1, it is determined whether or not a corner angle θ is smaller than the set corner angle α (step S31). If it is smaller, a minute-radius circular arc corner signal is turned on (step S32). If it is not smaller, the procedure transfers to step S30 to turn on the small circular arc corner signal and advances to step S33. In step S33, it is determined whether or not the machining of the block is completed, that is, the remaining amount of movement becomes "0". If it is not, the processing returns to step S21 to execute the processing following step S20.

When the remaining amount of movement becomes "0" and the movement for the block is completed, a corner signal is turned off (step S34), and the procedure comes back to step S20 to execute the processing following step S20.

Figure 5:
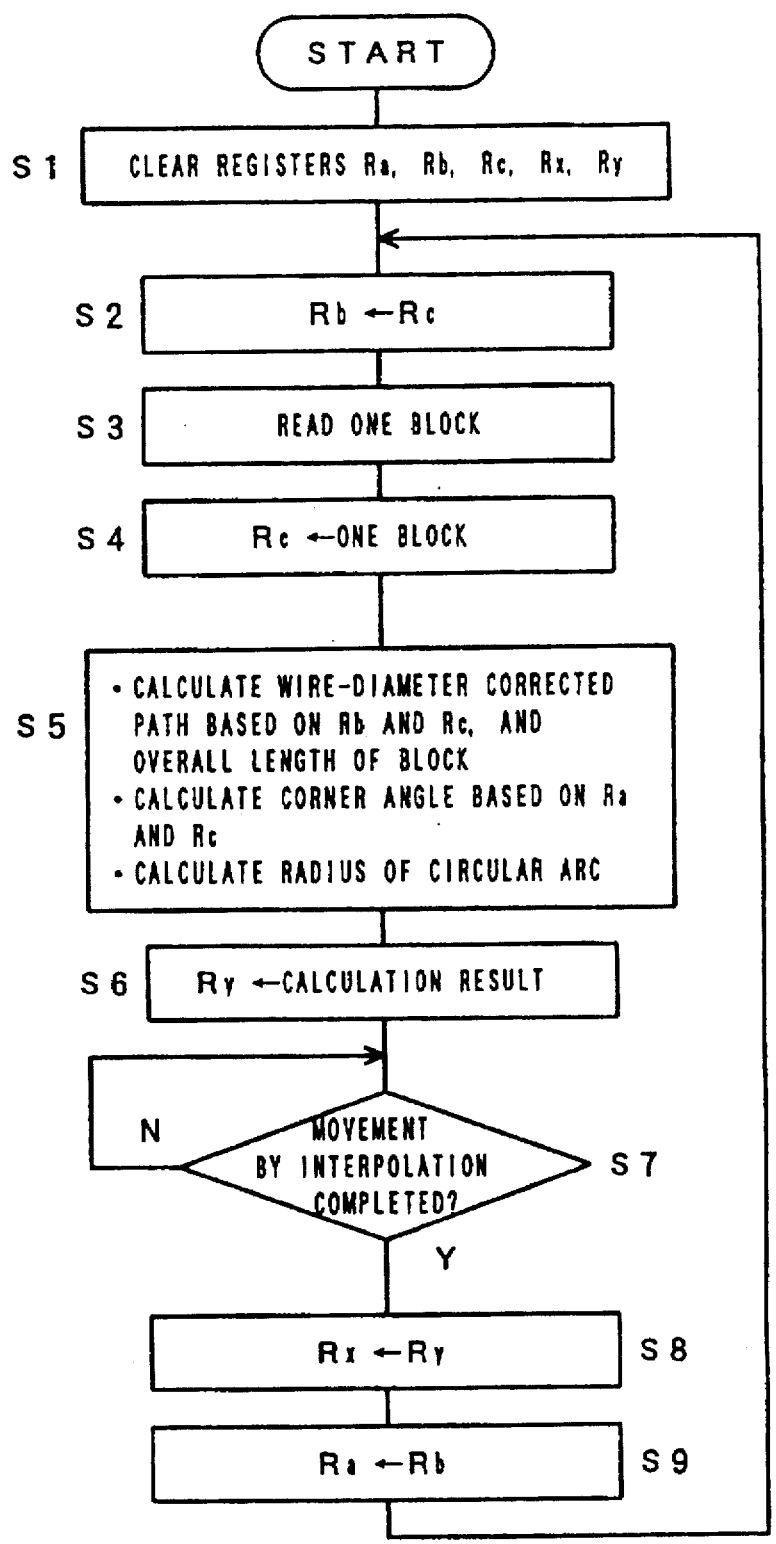
FIG. 5 is a flowchart of a preliminary processing to be executed by the control device.

As described above, the NC processor 36 executes the preliminary processing shown in FIG. 5 and the processing shown in FIG. 6. On the other hand, the PMC processor 33 executes the processing shown in FIGS. 7 to 10 in every predetermined cycle.

Figure 7:
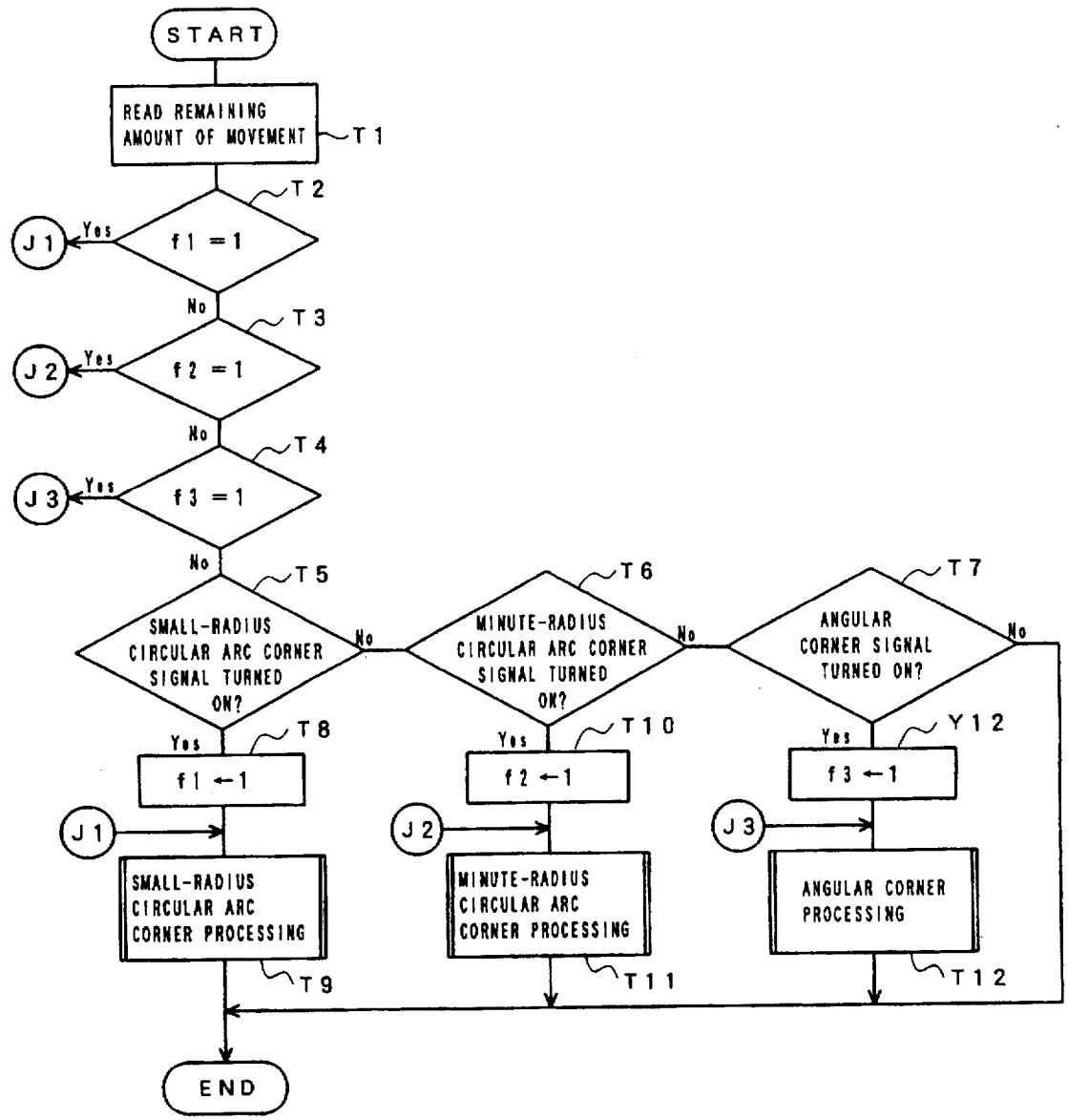
FIG. 7 is a flowchart of the corner control to be executed by a PMC processor.
Figure 8:
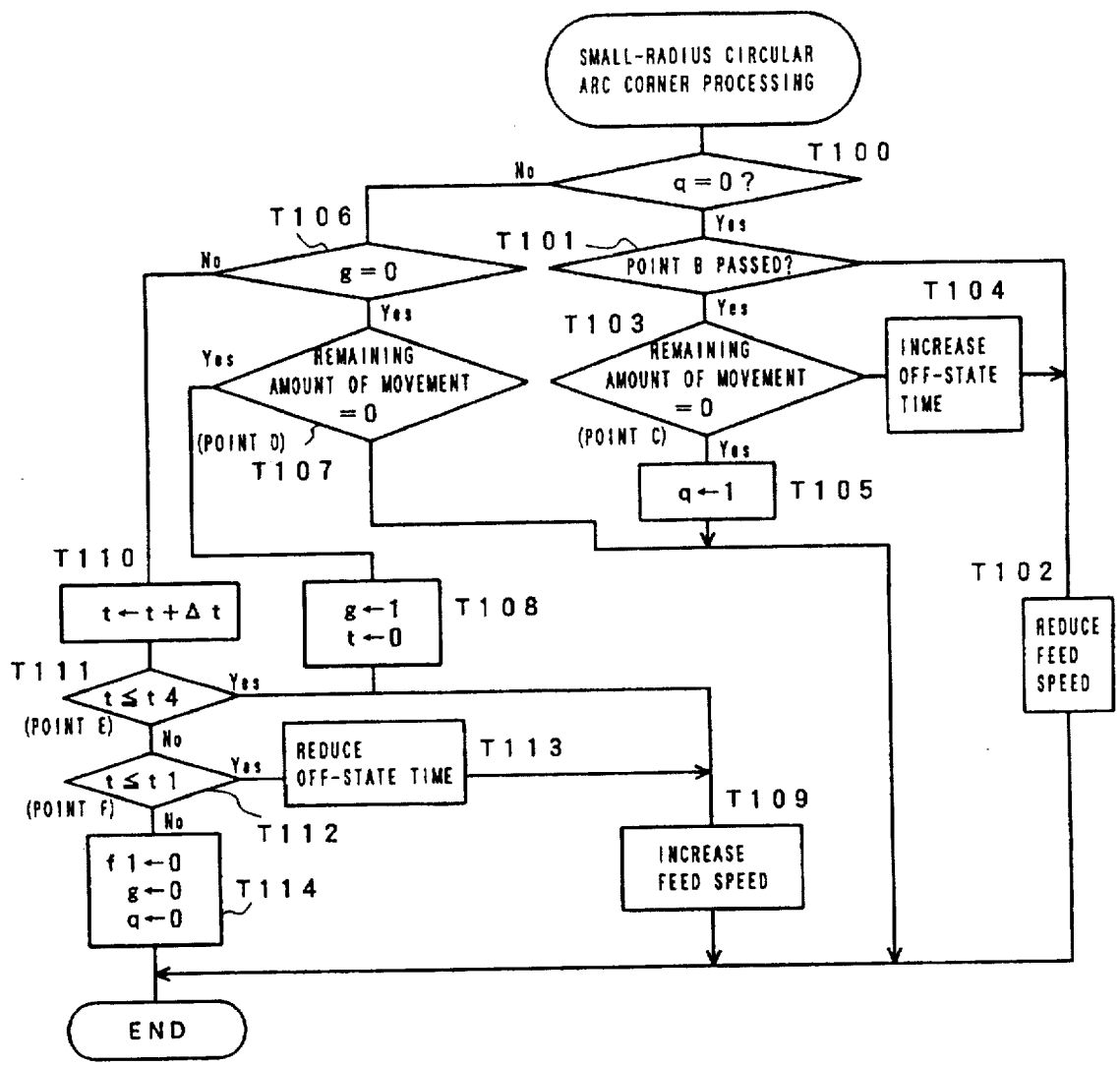
FIG. 8 is a flowchart of the corner machining processing for a small circular arc.
Figure 9:
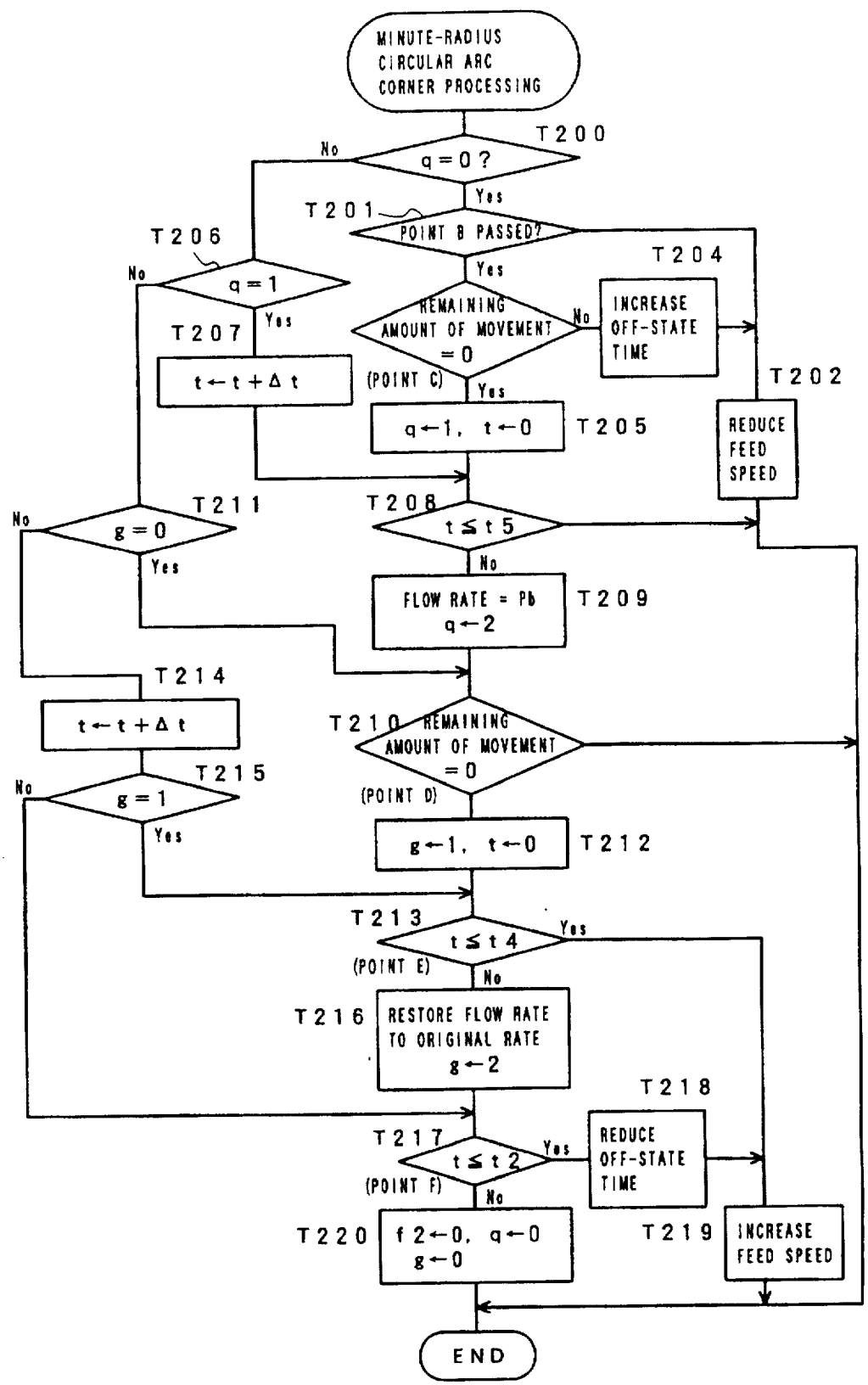
FIG. 9 is a flowchart of the corner machining processing for a minute circular arc.
Figure 10:
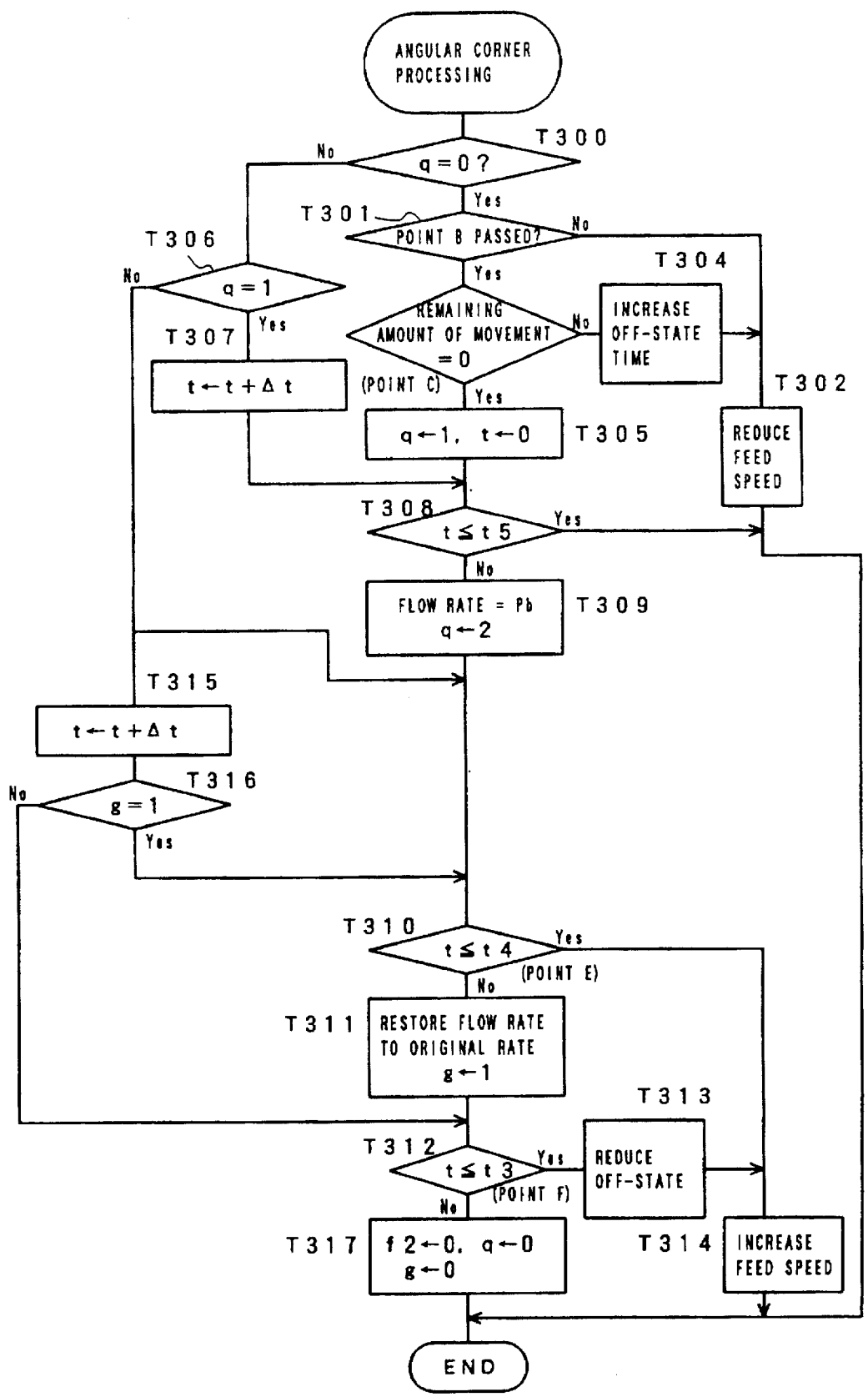
FIG. 10 is a flowchart of the corner machining processing for an angular corner.

The PMC processor 33 reads the remaining amount of movement transferred from the NC processor 36 (step T1), and determines whether or not flags f1, f2 and f3 are respectively set to "1" (steps T2, T3 and T4). If these flags are not set to "1" (they are not set in the initial stage), it is determined which of a small circular arc corner signal, a minute-radius circular arc corner signal and an angular corner signal is turned on (steps T5, T6 and T7). If the small circular arc corner signal is turned on, the flag f1 is set to "1" and the small circular arc corner processing shown in FIG. 8 is executed (steps T8 and T9), to complete the processing of this cycle. If the minute circular arc corner signal is turned on, the flag f2 is set to "1" and the minute circular arc corner processing shown in FIG. 9 is executed (steps T10 and T11), to complete the processing of this cycle. If the angular corner signal is turned on, the flag f3 is set to "1" and the angular corner processing shown in FIG. 10 is executed (steps T12 and T13), to complete the processing of this cycle. When all of the flags f1 to f3 are not "1" and all of the small circular, minute circular and angular corner signals are not turned on, the processing shown in FIG. 7 is completed without going further. Thus, when the flag f1 is set to "1", the procedure transfers from step T2 to step T9 in the next cycle since the flag f1 is already set to "1" and the small circular arc corner processing is executed. When the flag f2 is set to "1", the procedure transfers from step T3 to step T11 in the next cycle and the minute circular arc corner processing is executed. When the flag f3 is set to "1", the procedure transfers from step T4 to step T13 in the next cycle and the angular corner processing is executed.

FIG. 8 is a flowchart of small circular arc corner processing to be executed in step T9.

First, it is determined whether a flag q is "0" or not (step T100). The flag q is "0" in the initial stage and therefore the procedure transfers to step T101 to determine whether the remaining amount of movement Dr read in step T1 becomes smaller than the parameter value d2, that is, whether the point B is passed. If it has not passed, this means that a machining point is located between the points A and B in FIG. 1a (the small circular arc corner signal is turned on when the machining point has passed the point A and therefore the small circular arc corner processing shown in FIG. 8 is carried out after passing the point A). For this duration, the machining feed speed is reduced (step T102), and the procedure is completed.

The feed speed to be reduced is determined in the following manner.

As the feed speed has to be reduced continuously between the point A and the point C, a feed speed V on an arbitrary position between the points A and B is obtained from the following equation (1) by using the remaining amount of movement Dr (distance between the point C and the current machining point).

$$V = (Dr/\overline{AC}) \times (V_A - V_C) + V_C \quad (1)$$

Where, $\overline{AC}$: distance between A and C $V_A$: feed speed at the point A $V_C$: feed speed at the point C The feed speed $V_C$ at the point C is maintained during the corner portion machining. The feed speed $V_C$ is obtained from the following equation (2) based on a speed $V_0$ and an off-state time τ0 for the straight machining, the off-state time τ1 for the small circular arc corner control, and the ratio r1 for limiting a speed on a small circular arc corner, which are set as machining conditions.

$$V_C = V0 \times (\tau0/\tau1) \times r1 + 100 \quad (2)$$

The feed speed for the present is obtained by substituting the value of $V_C$ calculated according to the above equation (2) in the above equation (1) and the obtained feed speed is outputted to the NC processor. The NC processor controls the feed speed by executing interpolation processing based on the feed speed for the present.

In the small circular arc corner processing, the processing of steps T100, T101 and T102 is executed for each cycle until the point B is passed.

When the remaining amount of movement Dr has become smaller than the parameter value d2 and a machining point has passed the point B, the processing advances from step T101 to step T103 to determine whether or not the remaining amount movement Dr is "0", that is, whether or not the machining point has arrived at the point C. If the point C has not been reached, the off-state time is increased (step T104). The off-state time τ is obtained by the following equation (3) using the off-state time τ0 for the straight portion, the off-state time τ1 for the small circular arc corner, a distance between points B and C, and the remaining amount of movement Dr (distance between the current machining point and the point C).

$$\tau = (Dr/\overline{BC}) \times (\tau0 - \tau1) + \tau1 \quad (3)$$

Where $\overline{BC}$: distance between points B and C

More particularly, as the off-state time is continuously changed from the off-state time τ0 for the straight machining preceding the corner machining to the off-state time τ1 for the small circular arc corner, the off-state time is determined by the equation (3) so that it is gradually increased from the point B and becomes equal to the set value τ1 when the machining point has arrived at the point C, and the determined off-state time is outputted. The off-state time is sent to a machining power source through the input/output circuit 37, and the machining power source controls the voltage applied between the workpiece and the wire electrode on the basis of the off-state time.

After the off-state time is outputted as described above, the procedure transfers to step T102 where the feed speed in accordance with the aforesaid present position is calculated to complete the processing for reducing the feed speed.

On the other hand, if the remaining amount of movement becomes "0" and it is determined that a machining point has arrived at the point C in step T103, the flag g q is set to "1" (step T105) to complete the procedure of this cycle. In the next cycle, as the register q is set to "1", the procedure transfers from step T100 to step T106 to determine whether a flag g is "0". As the flag g is "0" in the initial stage, the procedure transfers to step T107, and it is determined whether or not the remaining amount of movement Dr is "0". The remaining amount of movement is not "0" immediately after the machining point passes the point C and the machining point has not arrived at the point D. This means that the machining of the circular arc portion between points C and D is in progress and in this case the procedure is completed. As a result, during machining of the circular arc between points C and D, the machining feed speed is kept to the set value $V_C$ and the off-state time is kept to the set value τ1.

Then, when it is determined in step T107 that the remaining amount of movement Dr has become "0" and the machining point has passed the point D, the flag g is set to "1", a register t serving as a timer is set to "0" (step T108), and the feed speed V is increased. The feed speed is increased to restore its original feed speed V0 ($V_A$) within a time period for restoring the feed speed for the small circular arc corner control set by the parameter F1. Thus, the feed speed is obtained according to the following equation (4) based on the value of timer t.

$$V = V_C + \{(V_A - V_C) \times t/t1\} \tag{4}$$

Both flags q and g are set to "1" in the following processing cycles and therefore the procedure advances successively to steps T100, T106, and T110. Then, the processing period Δt is added to the timer t and it is determined whether or not the value of the timer t has passed the parameter t4 representing the restoration start time of the off-state time and the restoration start time of the machining fluid (Step T111). If the period of time has not been passed, the procedure transfers to step T109. The value of the parameter t4 represents the time for starting the restoration of the off-state time and also the time for restoring the flow rate of the machining fluid for the minute circular arc machining and the angular corner machining, which will be described later. Subsequently, processing of steps T100, T106, T110, T111 and T109 are executed for each cycle until the value of timer t reaches the parameter value t4 (until the machining point arrives at the point E in FIG. 1) and only feed speed is increased. If the value of timer t reaches the value of the parameter t4, the procedure advances from step T111 to step T112. The off-state time is reduced in step T113 until the value of the timer t reaches the value of parameter t1 and the feed speed is increased in step T109. The off-state time τ is obtained from the following equation (5) based on the values of the timer t, the parameter F4, the off-state time τ1 for the small circular arc corner and the off-state time τ0 for the straight machining.

$$\tau = \{(t-t4)/(t1-t4)\} \times (\tau 0 - \tau 1) + \tau 1 \tag{5}$$

Subsequently, processing of steps T100, T106, T110, T111, T112, T113 and T109 are executed for each cycle. If it is determined in step T112 that the value of timer t exceeds the time for restoring the feed speed for the small circular arc corner set as the parameter t1, the procedure transfers to step T114, where flags f1, g and q are set to "0" to terminate the corner machining control for the small circular arc.

FIG. 9 is a flowchart of the corner machining procedure for the minute circular arc shown in FIG. 2.

Steps T200 to T204 are the same processing as those in steps T100 to T104 in the corner machining control for the small circular arc. Thus, the processing for the machining from point A to point C in FIG. 2 is the same as that of the small circular arc corner control. The feed speed reduced in step T202 is determined according to the above equation (1), however, the feed speed at the point C used in the equation (1) is obtained by substituting parameters τ2 and r2 for parameters τ1 and r1 in the equation (2). Specifically, the feed speed at the point C is obtained according to the following equation (6).

$$VC = V0 \times (\tau 0/\tau 2) \times r2 \div 100 \tag{6}$$

The off-state time to be increased is determined according to the following equation (7) which is obtained by substituting parameter τ2 for the parameter τ1 in the above equation (3).

$$\tau = (Dr/\overline{BC}) \times (\tau 0 - \tau 2) + \tau 2 \tag{7}$$

If it is determined in step T203 that the remaining amount of movement is "0" and that the machining to the point C is completed, the flag q is set to "1" and the timer t is set to "0" (step T205). Then, it is determined whether the value of timer t is equal to or less than the value of parameter t5 representing the flow rate reduction start time of the machining fluid, and if it is so, the procedure of this cycle will be completed without going further. As the flag q has been set to "1", the sequence advances successively to steps T200, T206 and T207 in the following cycle of the procedure. The period Δt of the cycle is added to the timer t, and it is determined in step T208 whether or not the value of timer t is equal to or less than the flow rate reduction start time of the machining fluid. Subsequently, processing of steps T200, T206, T207 and T208 are executed for each cycle until the value of the timer t exceeds the value of parameter t5. During this processing, both the machining feed speed and the off-state time remain unchanged and thus constant. Then, when it is determined in step T208 that the flow rate reduction start time t5 of the machining fluid has elapsed, a command for changing the flow rate of the machining fluid to a flow rate in the corner machining set as the parameter Fr is outputted to a flow rate control device for the machining fluid through the input/output circuit 37, and the flag q is set to "2" (step T209). Subsequently, it is determined whether not the remaining amount of movement is "0", and if "0", the procedure of this cycle will be completed without going further. In the next cycle, the flag q has been set to "2" and therefore processing of steps T200, T206, T211 and T210 are executed until the remaining amount of movement becomes "0". During this processing, the machining feed speed and the off-state time will remain unchanged and thus constant. When the remaining amount of movement becomes "0" and the machining point arrives at the point D, the flag g is set to "1" and the timer t is set to "0" again (step T212). Then, it is determined whether the value of the timer t has reached the parameter t4 representing the flow rate restoration time for the machining fluid. If not, the machining feed speed is increased (step T219) to terminate the procedure of this cycle.

The processing in Step T219 for increasing the machining feed speed is similar to the processing in Step T109 in FIG.

8 in that the machining feed speed is determined using equation (4), but differs in that the parameter t2 is substituted for the parameter t1 in the equation (4). Thus, the machining feed speed is obtained according to the following equation (8).

$$V=V_C+\{(V_A-V_C) \times t/t2\} \quad (8)$$

As the flag q has been set to "2" and the flag g has been set to "1", processing of steps T200, T206, T211, T214, T215, T213 and T219 are executed in the following cycles. In step T214, the period Δt of the processing cycle is added to the timer t and the machining feed speed is increased until the value of the timer t exceeds the parameter value t4 to execute the machining.

When the value of the timer t exceeds the flow rate restoration time for the machining fluid, the procedure transfers from step T213 to T216, where the flow rate of the machining fluid is restored to the original rate (flow rate for the straight portion). Then, the flag g is set to "2" and it is determined whether the value of timer t exceeds the time t2 for restoring the machining feed speed for the minute circular arc (step T217). If not, the off-state time is reduced (step T218) and the machining feed speed is increased to complete the procedure of this cycle. The reduced off-state time is obtained according to the following equation (9).

$$\tau=\{(t-t4)/(t2-t4)\} \times (\tau 0-\tau 2)+\tau 2 \quad (9)$$

As the flag g has been set to "2", processing of steps T200, T206, T211, T214, T215, T217, T218 and T219 are executed in the following cycles for each processing period until the value of timer t exceeds the parameter t2, to execute the machining by decreasing off-state time and increasing feed speed.

When the value of timer t exceeds the value of parameter t2, the flags f2, q and g are set to "0" to terminate the corner machining processing for the minute-radius circular arc.

FIG. 10 is a flowchart of the angular corner processing. Steps T300 to T309 in this processing are the asame as steps T200 to T209 in the corner processing for the minute circular arc, but partially differ from those steps in the way of determining the decreasing speed and the increasing off-state time in steps T302 and T304. The decreasing feed speed is obtained by the aforesaid equation (1) and the feed speed at the point C in the equation (1) is calculated according to the following equation (10).

$$VC=V0 \times (\tau 0/\tau 3) \times r3+100 \quad (10)$$

The off-state time to be increased is calculated according to the following equation (11).

$$\tau=(Dr/\overline{BC}) \times (\tau 0-\tau 3)+\tau 3 \quad (11)$$

In addition, the parameter r3 representing the ratio of the entrance speed to the apex is set to an extremely small value, so that the feed speed in the vicinity of the point C becomes extremely low.

The machining feed speed is gradually reduced between points A and B (steps T300 to T302), and is further reduced between points B and C while increasing the off-state time (steps T300, T301, T303, T304 and T302). When the machining point has reached the point C, the machining is executed with a fixed off-state time and at an extremely low feed speed until the timer t measures the flow rate reduction start time of machining fluid set as the parameter t5 from the point of time when the machining point reached the point C (steps T300, T306, T307, T308). When the flow rate reduction start time of the machining fluid is elapsed, the flow rate of the machining fluid is changed to a flow rate set as the parameter Fr to reduce the flow rate, and the flag q is set to "2". Then, processing of steps T300, T306, T315, T316, T310 and T314 are executed for each processing period until the value of the timer t reaches the flow rate restoration time of machining fluid set as the parameter t4, and the processing period Δt is added to the value of timer t (step T315). Subsequently, it is determined in step T310 whether the value of the timer t exceeds the parameter value t4. If it has not exceeded the parameter value, the machining feed speed is increased.

When the value of the timer t exceeds the parameter value t4, the flow rate of the machining fluid is restored to the original rate (set as a machining condition) and the flag g is set to "1" (step T311). Then, it is determined whether the value of the timer t has exceeded the time of restoring the feed speed for the angular corner control set as the parameter t3 (step T312). If not, the off-state time is reduced (step T312) and the machining feed speed is increased (step T314).

As the flag g has been set to "1", processing of steps T300, T306, T315, T316, T312, T313 and T314 is executed in the following cycles to perform the machining with decreasing off-state time and increasing feed speed.

The feed speed V which is increased in step T314 and the off-state time τ which is reduced in step T313 are calculated according to the following equations (12) and (13), respectively.

$$V=VC+\{(VA-VC) \times t/t3\} \quad (12)$$

$$\tau=\{(t-t4)/(t3-t4) \times (\tau 0-\tau 3)\}+\tau 3 \quad (13)$$

When the timer value t exceeds the parameter value t3 in step T312, the flags f3, q and g are individually set to "0" to complete the angular corner processing.

Figure 11:
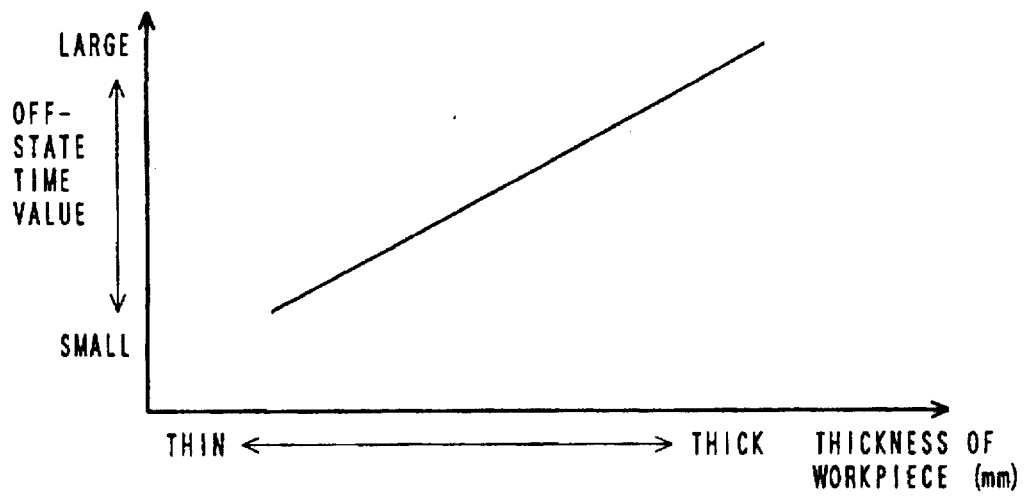
FIG. 11 is a diagram showing a relationship between a thickness of a workpiece and an off-state time of a corner portion.

In the above embodiment, the off-state time for the corner portion is set by using parameters τ1, τ2 and τ3. As the off-state time for the corner portion is to be increased in proportion to thickness of a workpiece, the relationship between a thickness of a workpiece and the off-state time for the corner portion as shown in FIG. 11 may be previously stored in a memory of the control device so that the off-state time of the corner portion can be automatically calculated in dependence upon the thickness of a workpiece, which is inputted as a machining condition. Furthermore, the ratio for limiting the feed speed for the corner portion may be set without using parameters r1, r2 and r3 but by previously storing various ratios for the corner portions (e.g., a small circular arc, minute circular arc and angular corners) so that the stored ratios can be read in accordance with the kind of the corner to perform the operation of the equations (2), (6) and (10). In this way, the number of parameters can be reduced and also errors or omission of setting can be prevented.

Furthermore, the flow rate (Fr) of the machining fluid, time (t1, t2 and t3) for restoring the feed speed, the feed speed restoration time and flow rate restoration time (t4) of the machining fluid may previously be stored in the memory of the control device without setting these parameters for each execution of machining (these parameters are set only once). In this way, the machining of the aforesaid corners can be performed by setting the machining conditions in the conventional manner to make the corner machining easier.

According to the present invention, a warp of the wire electrode due to a discharge pressure at the beginning of the corner machining can be prevented, thereby improving the machining accuracy of the corner portion. Moreover, an off-state time of the voltage intermittently applied between the wire electrode and the workpiece is increased in accordance with the decrease of the feed speed so that a discharge per unit distance on a machining face of the workpiece is made substantially uniform, to further improve the machining accuracy. In addition, the machining feed speed and the off-state time are changed not rapidly but gradually, and the flow rate of the machining fluid is controlled in accordance with shapes of individual corner portions to further improve the machining accuracy of the corner portion.

What is claimed is:

1. A method of machining a corner portion in a workpiece using a wire electric discharge machine for machining the workpiece by applying a pulse voltage between a wire electrode and the workpiece while supplying machining fluid to a gap between the wire electrode and the workpiece and by feeding the workpiece relative to the wire electrode, said method comprising the steps of:

identifying the corner portion as one of an arc corner portion, a minute arc corner portion, and an angled corner portion;

reducing a machining feed speed from a first machining feed speed to a second machining feed speed in a section from a point preceding a machining starting point of said corner portion by a first predetermined distance to the machining starting point of said corner portion;

increasing an off-state time of said pulse voltage from a first off-state time to a second off-state time in a section from a point preceding the machining starting point of said corner portion by a second predetermined distance, different from said first predetermined distance, to the machining starting point of said corner portion;

maintaining the machining feed speed at said second machining feed speed and the off-state time of said pulse voltage at said second off-time during the corner portion machining; and restoring the machining feed speed to said first machining feed speed and the off-state time of said pulse voltage to said first off-state time after completing the corner portion machining, with the off-state time of said pulse voltage being restored a third predetermined distance past said corner portion.

2. A wire electric discharge machining method according to claim 1, wherein said maintaining step comprises a step of reducing a flow rate of the machining fluid by a predetermined rate during the corner portion machining.

3. A wire electric discharge machining method according to claim 1, wherein said second off-state time is determined in dependence on a thickness of the workpiece.

4. The wire electric discharge machining method according to claim 3, further comprising a step of automatically determining said second machining feed speed in accordance with a curvature of said corner portion and said second off-state time.

* * * * *